United States Patent

Koch et al.

[11] Patent Number: 5,817,345
[45] Date of Patent: *Oct. 6, 1998

[54] TURRENT ARTICLE MOLDING MACHINE AND METHOD OF USE

[75] Inventors: Michael Koch, King; Robert Schad, Toronto; Robin Arnott, Alliston, all of Canada

[73] Assignee: Husky Injection Molding System Ltd., Canada

[*] Notice: The term of this patent shall not extend beyond the expiration date of Pat. No. 5,750,162.

[21] Appl. No.: 772,474

[22] Filed: Dec. 23, 1996

Related U.S. Application Data

[63] Continuation-in-part of Ser. No. 718,788, Sep. 24, 1996, Pat. No. 5,750,162, which is a continuation-in-part of Ser. No. 611,362, Mar. 6, 1996, Pat. No. 5,728,409.

[51] Int. Cl.$^6$ ................................................. B29C 45/16
[52] U.S. Cl. .................. 425/130; 264/297.8; 264/328.8; 264/328.11; 425/572; 425/576
[58] Field of Search ..................................... 425/130, 533, 425/576, 575, 574, 572; 264/297.8, 328.8, 328.11

[56] References Cited

U.S. PATENT DOCUMENTS

| | | |
|---|---|---|
| 2,333,056 | 10/1943 | Thoreson et al. . |
| 3,730,665 | 5/1973 | Fortin et al. . |
| 3,833,329 | 9/1974 | Ulmachneider et al. . |
| 3,881,855 | 5/1975 | Farkas . |
| 3,988,100 | 10/1976 | Julien . |
| 4,243,362 | 1/1981 | Rees et al. . |
| 4,330,257 | 5/1982 | Rees et al. . |
| 4,363,619 | 12/1982 | Farrell . |
| 4,370,124 | 1/1983 | Buja . |
| 4,427,359 | 1/1984 | Fukuoka et al. . |
| 4,444,711 | 4/1984 | Schad . |
| 4,449,913 | 5/1984 | Krishnakumar et al. . |
| 4,734,023 | 3/1988 | Nesch et al. . |
| 4,836,767 | 6/1989 | Schad et al. . |
| 5,314,327 | 5/1994 | Stein . |
| 5,336,462 | 8/1994 | Wohlrab . |
| 5,338,171 | 8/1994 | Hayakawa et al. . |
| 5,609,890 | 3/1997 | Boucherie ................................ 425/130 |

*Primary Examiner*—Tim Heitbrink
*Attorney, Agent, or Firm*—Bachman & LaPointe, P.C.

[57] ABSTRACT

An injection molding machine of the present invention includes a first mold half having one of at least one mold cavity and at least one mold core and a rotatable turret block rotatable on an axis for rotating a plurality of movable mold halves thereof into alignment with the first mold half. Each of the movable mold halves include one of at least one mold cavity and at least one mold core matable with the first mold half for forming a mold for molding a molded article. The rotatable turret block is further for clamping the movable mold halves and the first mold half together. The machine further includes a mechanism for moving the rotatable turret block relative the first mold half, a first injector for injecting melt into the at least one mold cavity, to form an injected article and a second injector for injecting melt into the at least one mold cavity over the injected article to form an injected article having at least two layers.

38 Claims, 16 Drawing Sheets

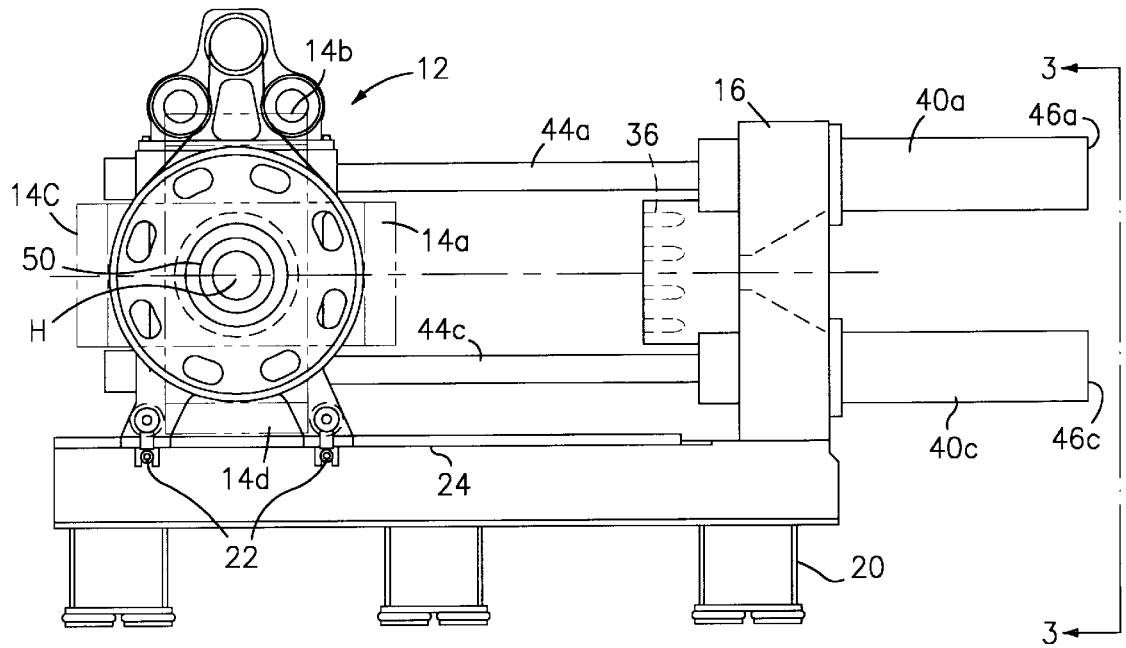
FIG. 2
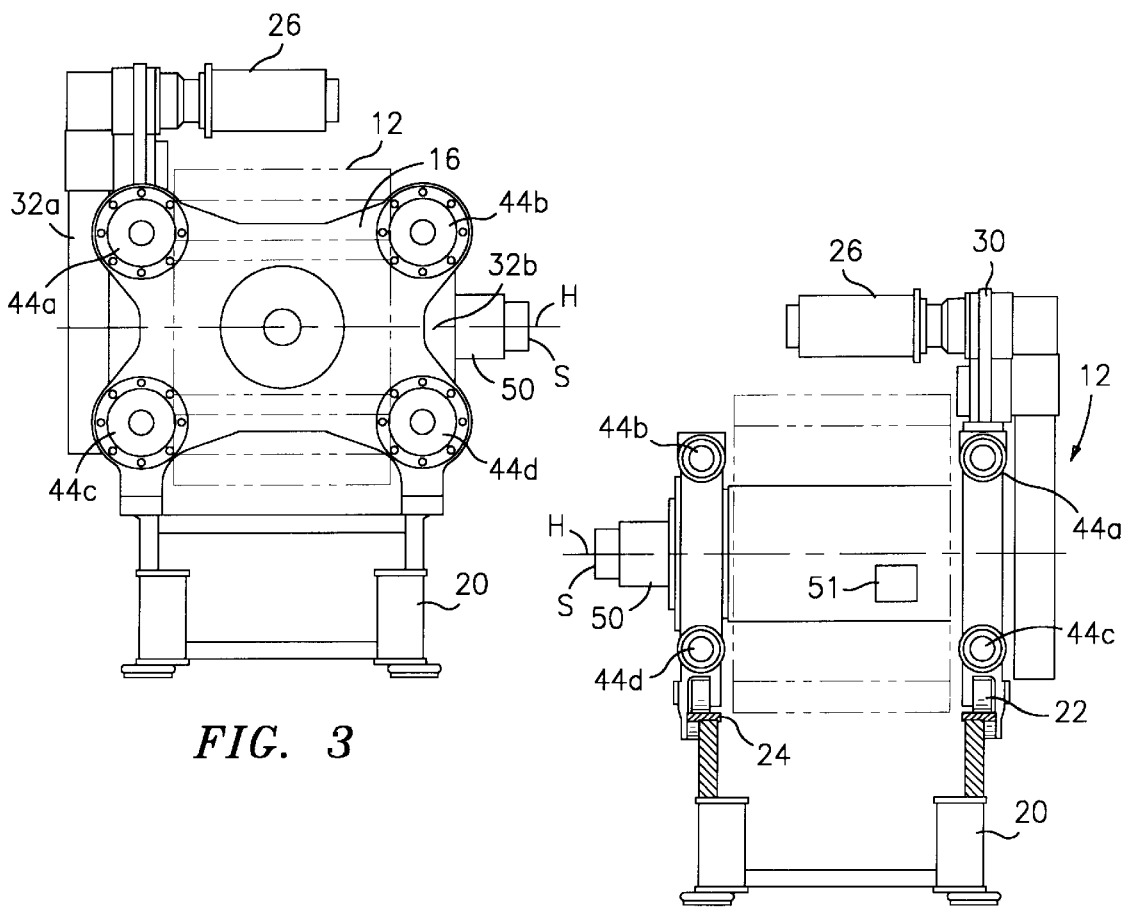
FIG. 3
FIG. 4

TURRENT ARTICLE MOLDING MACHINE AND METHOD OF USE

CROSS-REFERENCE TO RELATED APPLICATIONS

This application is a Continuation-In-Part of application Ser. No. 08/718,788, now U.S. Pat. No. 5,750,162, for TURRET ARTICLE MOLDING MACHINE INCLUDING BLOW MOLDING, filed Sep. 24, 1996, which in turn is a Continuation-In-Part of application Ser. No. 08/611,362, filed Mar. 6, 1996, now U.S. Pat. No. 5,728,409.

BACKGROUND OF THE INVENTION

This invention is directed to a turret style injection molding machine, and more particularly, to an injection molding machine having a rotating and longitudinally movable turret block with a plurality of mold halves rotatable and movable into engagement with a non-rotatable mold half, a first injection means for forming an injected article, and a second injection means for forming an injected article having at least two layers.

Injection molding machines having turret configurations for moving mold halves into and out of alignment with other mold halves are well known in the prior art. A turret type configuration for injection molding is beneficial since it lends itself to high volume production of molded parts. This is true since different molding related operations can be performed using the turret configuration, simultaneous to the actual molding of the part. That is, while one part is being molded on the turret block, another part having already been molded or to be molded can be subjected to a plurality of post molding or pre-molding operations. These operations include, for example, injecting, holding, cooling and ejecting, each of which can be performed at a different angular position relative the turret block.

The following patents disclose turret style injection molding machines wherein the turret has a vertical axis of rotation.

U.S. Pat. No. 4,734,023 to Nesch et al. discloses an injection molding machine which uses a four to eight sided turret block that rotates about a vertical axis and which is mounted between the stationary and moving platens of the machine. The turret is also slidable on lower tie bars between the platens.

U.S. Pat. No. 4,427,359 to Fukuoka discloses an injection stretch blow molding machine. The machine incorporates a four sided turret block positioned on a vertical axis wherein preforms are injection molded in a first position of the four sided turret block. Preforms are temperature conditioned inside a second conditioning mold at a second position of the block. The preforms are blow molded at a third position and ejected at a fourth.

U.S. Pat. No. 4,449,913 to Krishnakumar discloses a rotary injection turret for use in making preforms. The patent teaches a turret block rotatable on a vertical axis, which block uses two of the turret block positions for post mold treatment of preforms while the preforms are still on mold cores. Accordingly, after injection, hold and some cooling at a first station, the turret block rotates to a second position where cooling fluid is blown onto the exterior surface of the preforms in order to cool the preforms. At a third position, the preforms are inserted into a conditioning mold from the turret block where the gate vestige is trimmed and further temperature conditioning is performed.

Additional patents which disclose vertical axis turrets are U.S. Pat. No. 4,444,711 to Rees; U.S. Pat. No. 4,330,257 to Rees; U.S. Pat. No. 4,363,619 to Farrell; U.S. Pat. No. 3,833,329 to Ulmachneider; and U.S. Pat. No. 2,333,056 to Thoreson.

The following patents disclose injection molding machines using rotary turret block each of which have a horizontal axis of rotation.

U.S. Pat. No. 4,836,767 to Schad et al. discloses a swing plate molding machine. The swing plate molding machine includes two core mold halves and one single cavity mold half. During molding, parts are caused to remain on the cores of the mold halves and are swung to an outboard position where the parts are transferred into a four sided turret block arrangement for continued cooling. The turret rotates on a horizontal axis and may contain a mechanism for temperature conditioning at one of its stations.

U.S. Pat. No. 4,370,124 to Buja discloses a modular rotary molding machine. The rotary style machine disclosed has a wheel which rotates about a horizontal axis. The entire wheel and additional assembly is mounted on a movable carriage with respect to a fixed injection unit. The diameter of the wheel is adjustable to vary the number of molds processed. Each mold thereon is filled individually and then clamped and packed by units positioned on board the wheel.

U.S. Pat. No. 4,243,362 to Rees discloses a composite molding apparatus for molding articles from two materials. The apparatus includes a four sided turret block rotatable between two opposed faces about a horizontal axis. The block is mounted slidably between a fixed and a moving platen of a horizontal injection molding machine. Two material molding is achieved by injecting different materials from separate injectors when the block is in each of two positions.

Additional turret style injection molding machines having a horizontal axis of rotation include U.S. Pat. No. 3,988,100 to Julien; U.S. Pat. No. 3,881,855 to Farkas; and U.S. Pat. No. 3,730,665 to Fortin.

The prior art also includes a plurality of two platen injection molding machines, some of which are discussed as follows.

U.S. Pat. No. 5,338,171 to Hayakawa discloses a die clamping apparatus with an aligning device. The apparatus includes a two platen clamp with alignment means provided by vertically adjustable trunnions under the movable platen. The trunnions are moved by cylinders which respond to deflection signals sensed at the ends of outriggers mounted to the moving platen.

U.S. Pat. No. 5,336,462 to Wohlrab discloses a mold closing apparatus for an injection molding machine. The machine includes a two platen clamp in which stroke cylinders are positioned inside tie bars, the ends of which also act as clamp pistons.

U.S. Pat. No. 5,314,327 to Stein discloses a mold clamp for an injection molding machine. The machine includes a two platen clamp with means to help align the mold halves. Adjustable rollers are used on a moving platen carriage and adjusting means are built into the carriage/moving platen assembly for improving alignment.

With respect to the prior art discussed above, no injection molding machines are disclosed having the objects and advantages discussed below and derived from the device disclosed herein. That is, each of the prior art devices discussed above has a relatively complex construction, requiring multiple mold platens and a greater number of moving parts. Accordingly, these devices inefficiently use excess floor space, exhibit greater energy consumption, and have relatively long cycle times.

There exists. a need, therefore, for a two platen injection molding machine having a turret clamp with a plurality of movable platens, wherein the turret clamp is rotatable on a horizontal axis and longitudinally movable for placement into and out of engagement with another platen, thereby reducing floor space usage and energy consumption and increasing efficiency.

SUMMARY OF THE INVENTION

The primary object of this invention is to provide an energy and space efficient two platen injection molding machine having a reduced cycle time which includes a longitudinally movable and rotatable turret block and which forms an injection molded article having at least two layers.

Another object of this invention is to provide a two platen injection molding machine including a longitudinally movable and rotatable turret block, wherein combinations of pre-mold and post mold operations may be efficiently achieved on one machine using different stations of the turret block, thereby reducing cycle time.

Still another object of this invention is to provide a two platen injection molding machine having a longitudinally movable and rotatable turret block, wherein operations such as loading, injection, label loading, temperature conditioning, and direct unloading of molded parts can be achieved at different angular positions in a continuous and efficient manner using one machine having a plurality of stations, thereby reducing cycle time, floor space consumption, and energy consumption.

Yet another object of this invention is to provide an energy, cycle time and space efficient two platen injection molding machine having a rotatable turret block which includes a plurality of movable mold clamps for forming molds for the injection molding of a variety of parts.

And yet another object of this invention is to provide a two platen injection molding machine using a movable and rotatable turret block which includes a plurality of mold halves movable toward and away from a mating stationary mold half for forming molds for injection molding a variety of parts in an energy and cycle time efficient manner.

And another object of this invention is to provide a two platen injection molding machine including a rotatable turret block having a plurality of mold half sides and a plurality of stations to which the mold half sides are rotated for pre-molding and post molding operations.

A particular object of the present invention is to provide a two platen injection molding machine including a rotatable turret block having a plurality of mold half sides and a plurality of stations wherein one of the stations includes a second injection means to form an injection molded article having at least two layers.

The foregoing objects and advantages are achieved by the present invention. The machine of the present invention includes: a first mold half having one of at least one mold cavity and at least one mold core; a rotatable turret means rotatable on an axis for rotating a plurality of movable mold halves thereof into alignment with said first mold half, each of said movable mold halves including one of at least one mold cavity and at least one mold core matable with said first mold half for forming a mold for molding a molded article, said rotatable turret means further for clamping said movable mold halves and said first mold half together; means for moving said rotatable turret means relative said first mold half; a first injection means for injecting melt into said at least one mold cavity at a first injection station to form an injection molded article; further including at least one second injection means for injecting melt over said injection molded article to form an injection molded article having at least two layers. The second injection means is desirably at a second injection station spaced from the first injection station.

The details of the present invention are set out in the following description and drawings wherein like reference characters depict like elements.

BRIEF DESCRIPTION OF THE DRAWINGS

FIG. 2 is a partial elevational side view of the clamp portion of an injection molding machine in an open position and in accordance with the principles of the present invention;

FIG. 3 is an end partially cross-sectional view taken along line 3—3 of FIG. 2;

FIG. 4 is an end view taken along line 4—4 of FIG. 1;

DETAILED DESCRIPTION OF THE PREFERRED EMBODIMENT

Figure 1:
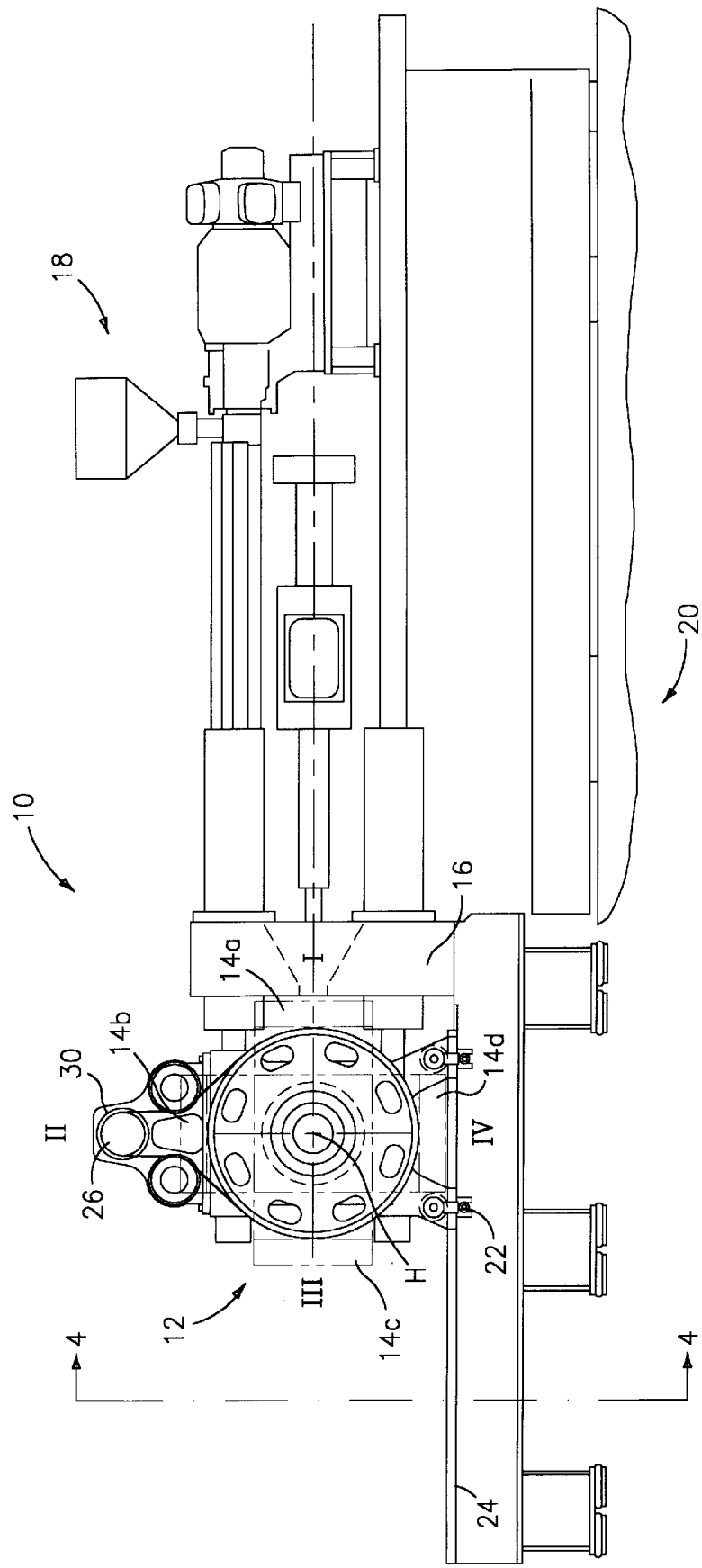
FIG. 1 is a side elevational schematic view of an injection molding machine in a closed position and in accordance with the principles of the present invention.

Referring now to the drawings in detail there is shown in FIG. 1 an elevational and schematic side view of the injection molding machine of the present invention, which is designated generally as 10. Injection molding machine 10 generally includes a rotatable turret block 12 with a plurality of movable mold halves 14a–14d, a stationary mold half and platen 16 and injection unit 18, all positioned on base 20.

Injection molding machine 10 may be used for molding a variety of different types of articles and accordingly, is not limited for use with any particular type of article. Preforms are referred to throughout this description by way of example only.

While the block is shown throughout this description as rotatable on a horizontal axis, and this is the preferred embodiment, it infeasible that a similar design of a movable turret block providing the clamping action may be provided which is rotatable on a vertical axis. Accordingly, this invention is not considered limited to the horizontal axis feature.

As shown in FIGS. 1–5, turret block 12 is preferably longitudinally movable on base 20 via a set of rollers 22 attached to the bottom of the turret block and thereby provides a mold clamp force. Base 20 includes hardened ways 24 which engage rollers 22, wherein rollers 22 engage the underside of ways 24 so as to counteract upward forces and tipping forces that may act on the turret block assembly. Turret block 12 is rotatable preferably by a motor, preferably an electric servo drive motor 26 and preferably on a horizonal axis H through arcuate sectors preferably of substantially 90°. Preferably, the electric servo drive motor is connected via a belt drive 30 to axis H for rotating turret block 12, as shown in FIG. 4, while the electric servo drive motor is preferably mounted on one of turret block carriages 32a and 32b extending from base 20.

Figure 5:
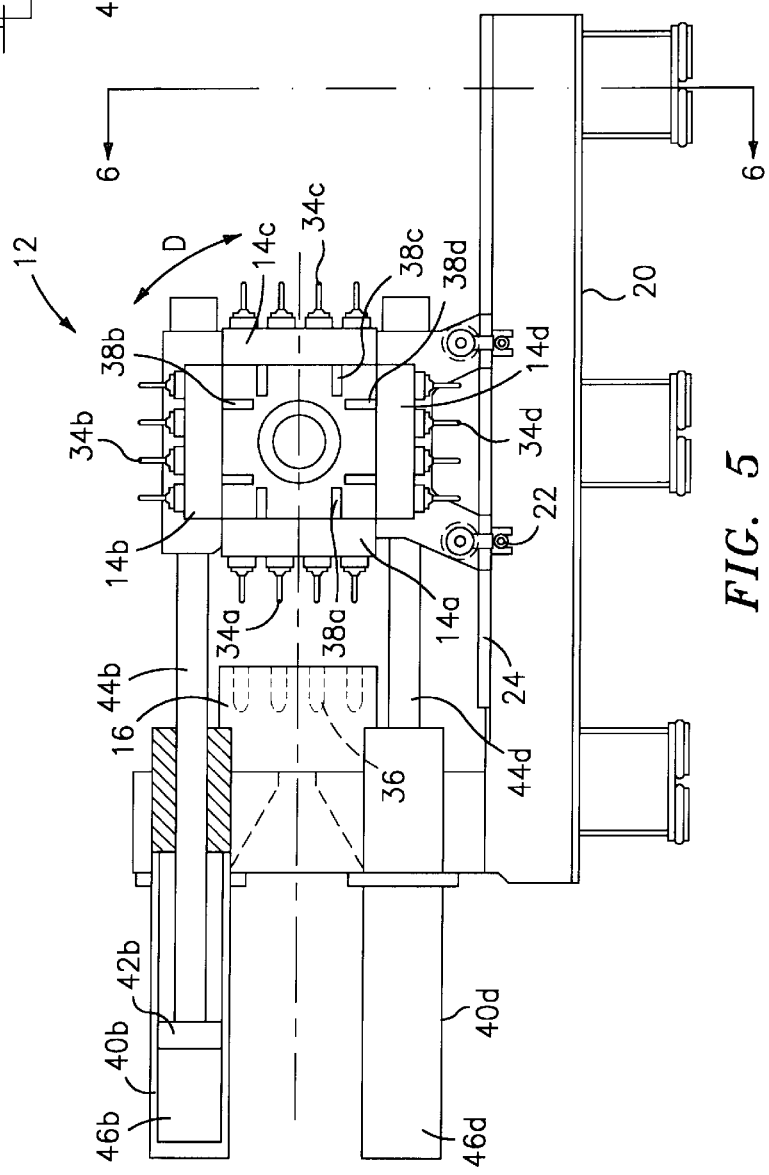
FIG. 5 is a side elevational and partially cross-sectional view from the side opposite of that shown in FIG. 2 with the clamp portion of the injection molding machine in the partially open position.

As shown in FIG. 5, turret block 12 includes a plurality of movable mold halves, i.e. movable mold halves 14a–14d each of which includes a set of mold cores 34a–34d, respectively, each set having at least one mold core, adapted for engagement with a set of mold cavities 36, each set including at least one mold cavity and located in stationary mold half and platen 16. Preferably, four movable mold halves or faces 14a–14d are provided on turret block 12, although any number supportable by the size of the turret block 12 can be used. Sets of mold cores 34a–34d are adapted to be rotated into horizontal and vertical alignment with sets of mold cavities 36.

Referring still to FIG. 5, turret block 12 includes sets of ejector pistons or stripper rings 38a–38d, and a system for the operation thereof, which operate on sets of mold cores 34a–34d and strippers positioned on movable mold halves 14a–14d, respectively. Accordingly, sets of ejector pistons or stripper rings 38a–38d are positioned within turret block 12 and parallel to sets of mold cores 34a–34d and perform the function of stripping the mold cores of finished molded articles, for example, preforms, such as those shown in FIGS. 8–10. Each movable mold half and platen 14 includes at least one ejector piston in each set 38a–38d for stripping finished articles from sets of mold cores 34a–34d. For the detailed design of one embodiment of the ejector piston or stripper ring system for use with sets 38, reference is made to U.S. Pat. No. 5,383,780, issued Jun. 24, 1995, to the assignee of the present invention, for incorporation by reference of a design of the ejector piston or stripper ring system, particularly column 4, line 29, to column 7, line 6, and FIGS. 1–8. Preferably, the ejector piston or stripper ring system is actuated via the hydraulic services supplied to the turret block, as discussed below. The hydraulically actuated ejector piston or stripper ring system actuated by on board hydraulic services is the preferred design, however, other designs may be used.

Figure 6:
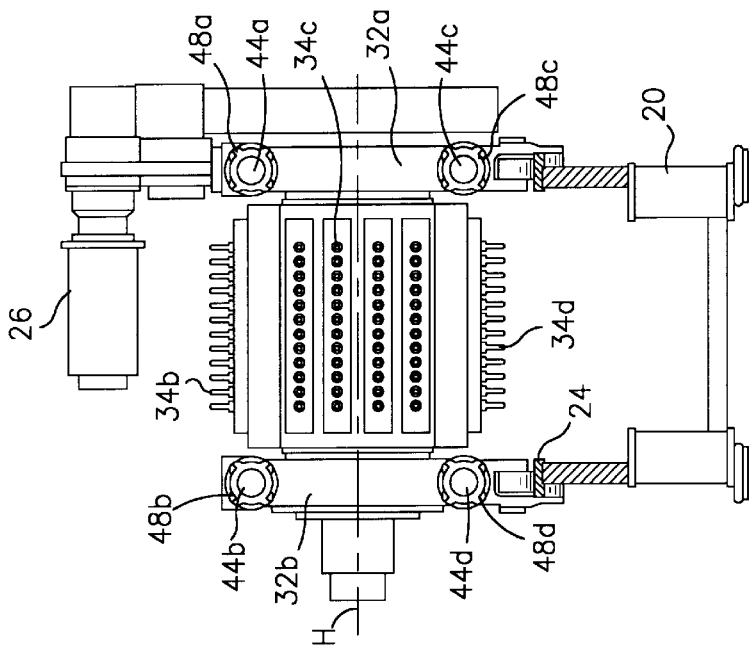
FIG. 6 is an end elevational and detailed view taken along line 6—6 of FIG. 5.

Turret block 12 is movable backward and forward along hardened ways 24 on base 20 via piston/cylinder assemblies 40a–40d positioned in stationary mold half and platen 16, as shown in FIG. 5. Preferably four piston/cylinder assemblies 40a–40d, as shown in FIGS. 2, 3 and 5, are used which are positioned in the corners of stationary mold half or platen 16. Each piston/cylinder assembly 40a–40d includes a piston 42a–42d (42a, 42c and 42d not shown), which pistons 42a–42d are attached to tie bars 44a–44d, respectively, which tie bar acts as the piston shaft. Accordingly, tie bars 44a–44d extend from the piston/cylinder assemblies 40a–40d and are connected at an opposite end to turret block 12. In order to move turret block 12 backward and forward relative stationary mold half and platen 16, pressurized fluid is forced into cylinders 46a–46d against pistons 42a–42d, respectively. The side of pistons 42a–42d in which pressurized fluid is forced against, determines the direction in which turret block 12 moves relative stationary mold half and platen 16, that is, either into an open or closed position, shown in FIGS. 2 and 5, respectively. Tie bars 44a–44d pass through the turret block carriages 32a and 32b and are attached thereto via retaining nuts 48a–48d, as shown in FIG. 6, respectively.

Services S, shown schematically in FIG. 3 and 4, are provided to turret block 12 via a rotary union 50, also shown schematically. Accordingly, as turret block 12 rotates, services S are continuously supplied to the movable mold halves 14a–14d. Such services S include the supply of electricity, pressurized fluid, cooling fluids, and hydraulic fluids, etc. For using these services, turret block 12 also includes the required circuitry and control valves 51 (shown schematically) on board and movable and rotatable with the turret block.

Figure 7:
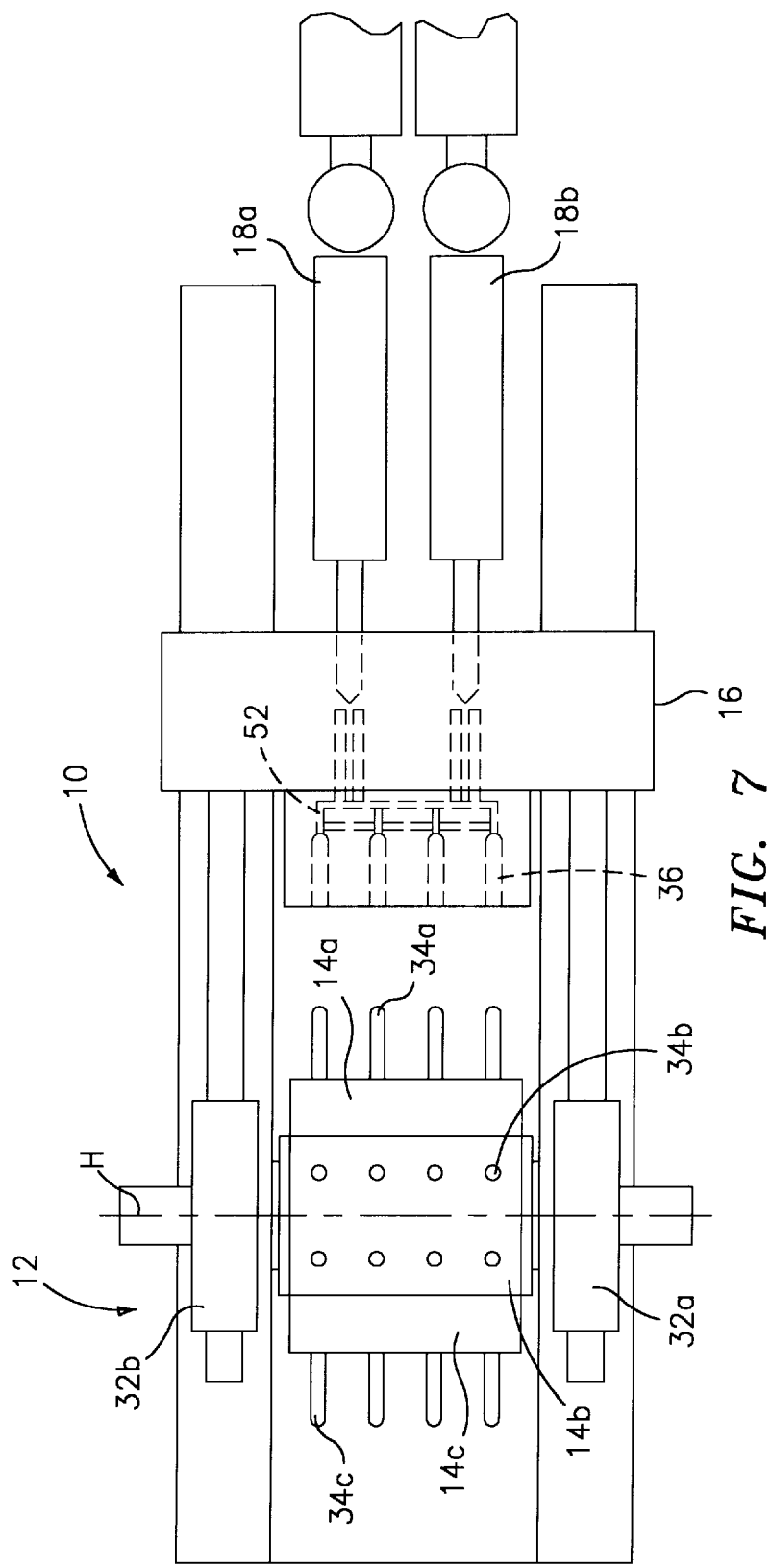
FIG. 7 is an overhead schematic view of the injection molding machine of the present invention similar to that shown in FIG. 1 showing an embodiment including a pair of injecting mechanisms.

Injection unit 18, preferably in the form of a reciprocating screw injection unit, is connected with stationary mold half and platen 16 positioned on base 20 for providing melt to the mold cores for molding. Injection unit 18 is preferably movable into and out of engagement with stationary mold half and platen 16 by means of carriage cylinders (not shown) on rollers and hardened ways, similar to as described above for use with turret block 12. In one embodiment, as shown in FIGS. 7, injection molding machine 10 of the present invention can provide co-injection of articles, for example, preforms. For this arrangement, two conventional reciprocating screw injection units 18a and 18b are used to feed two different kinds of resins into conventional mold cavities, such as those shown in stationary mold half and platen 16, which mold half and platen 16 includes a two material hot runner system 52 which delivers both resins into each mold cavity within stationary mold half and platen 16 for molding multi-layered articles, for example, preforms.

As discussed briefly above, injection molding machine 10 may include a plurality of stations, preferably stations I–IV, although more or less stations may be used, positioned adjacent the periphery of turret block 12, which stations I–IV are used for the performance of pre-molding or post-molding operations.

Figure 8:
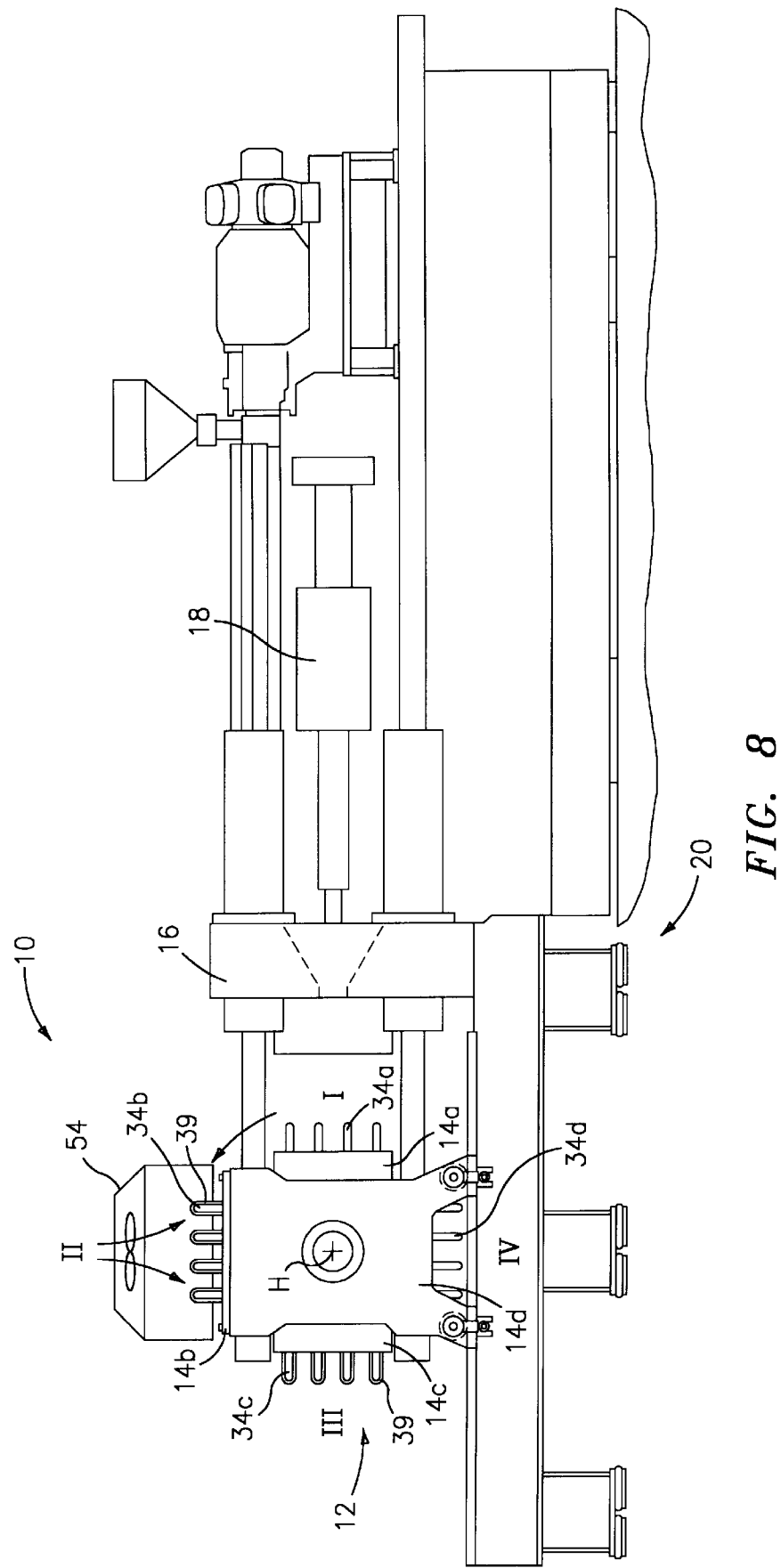
FIG. 8 is a side elevational schematic view of an injection molding-machine of the present invention similar to that shown in FIG. 1, showing an embodiment thereof including a cooling station.

For example, and as shown in FIG. 8, an embodiment of injection molding machine 10 may include a temperature conditioning station 54, the design of which is not critical, preferably at station II, where temperature controlled air or other coolant is preferably directed onto newly molded articles to increase the rate of cooling thereof. If used with the co-injection case discussed above, the temperature conditioning station also enhances bond strength between the layers of the different resins used during co-injection. Based on the location of other stations, as discussed below, temperature conditioning station 54 may be located at one of the other stations, for example stations III and IV.

Figure 9:
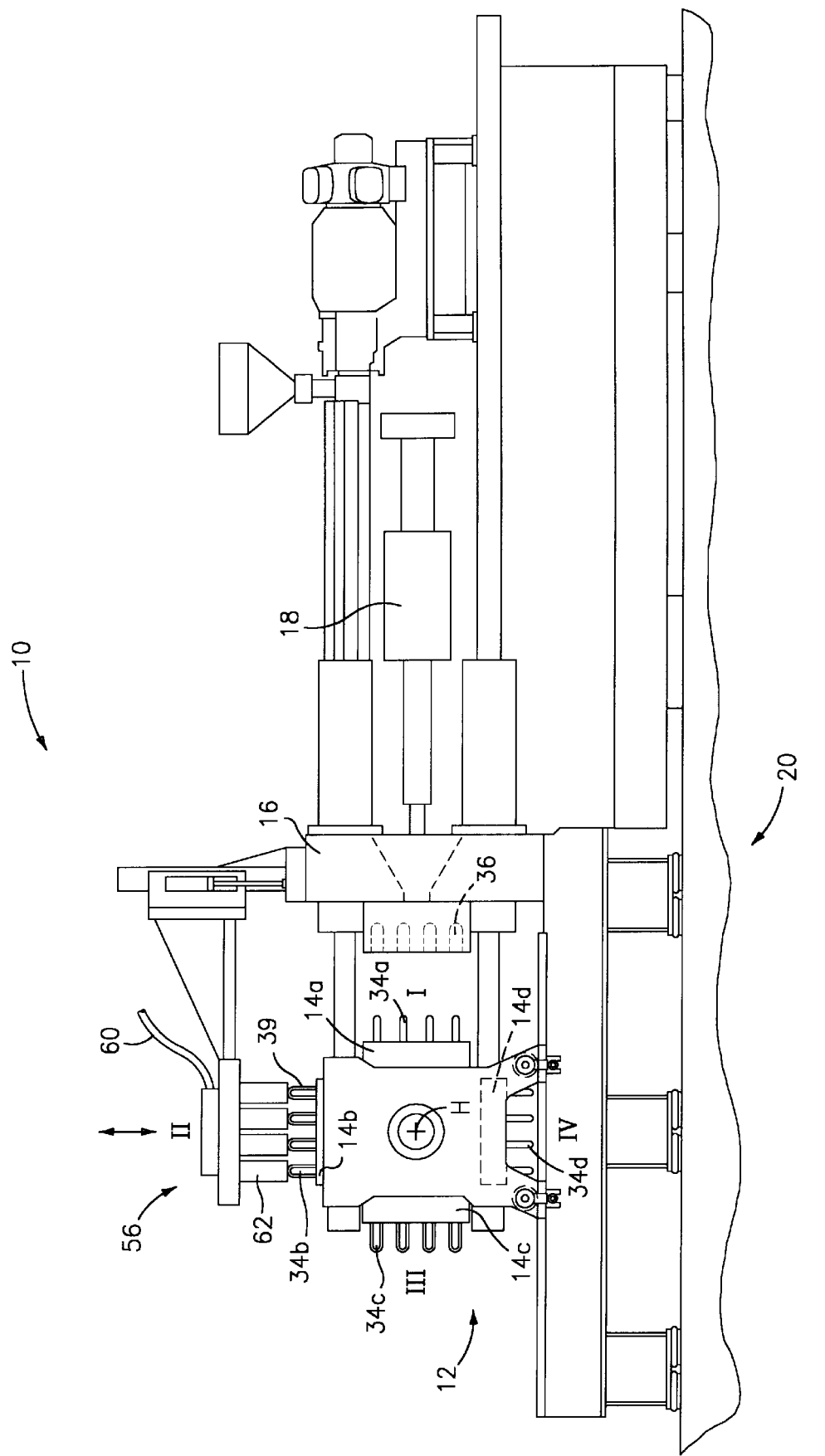
FIG. 9 is a side elevational and schematic view of an injection molding machine of the present invention similar to that shown in FIG. 1, showing an embodiment thereof including a label loading station.

In FIG. 9, another embodiment of injection molding machine 10 is shown wherein a label loading robot 56 is used to attach labels to the outside of molded articles after they have been rotated away from the molding station through an arcuate sector of 90° to a second station II. In label loading robot 56, labels are preferably conveyed inside a tube 60 to positioning areas 62 and retained at positioning areas 62 via the application of vacuum. Positioning areas 62 are positioned over at least one finished molded article while the molded article are positioned at the second station II. For applying the labels, the vacuum is preferably reversed to positive pressure and the labels are blown from positioning areas 62 into contact with preferably still hot but finished molded articles 39 for adhering the labels to the articles.

Figure 10:
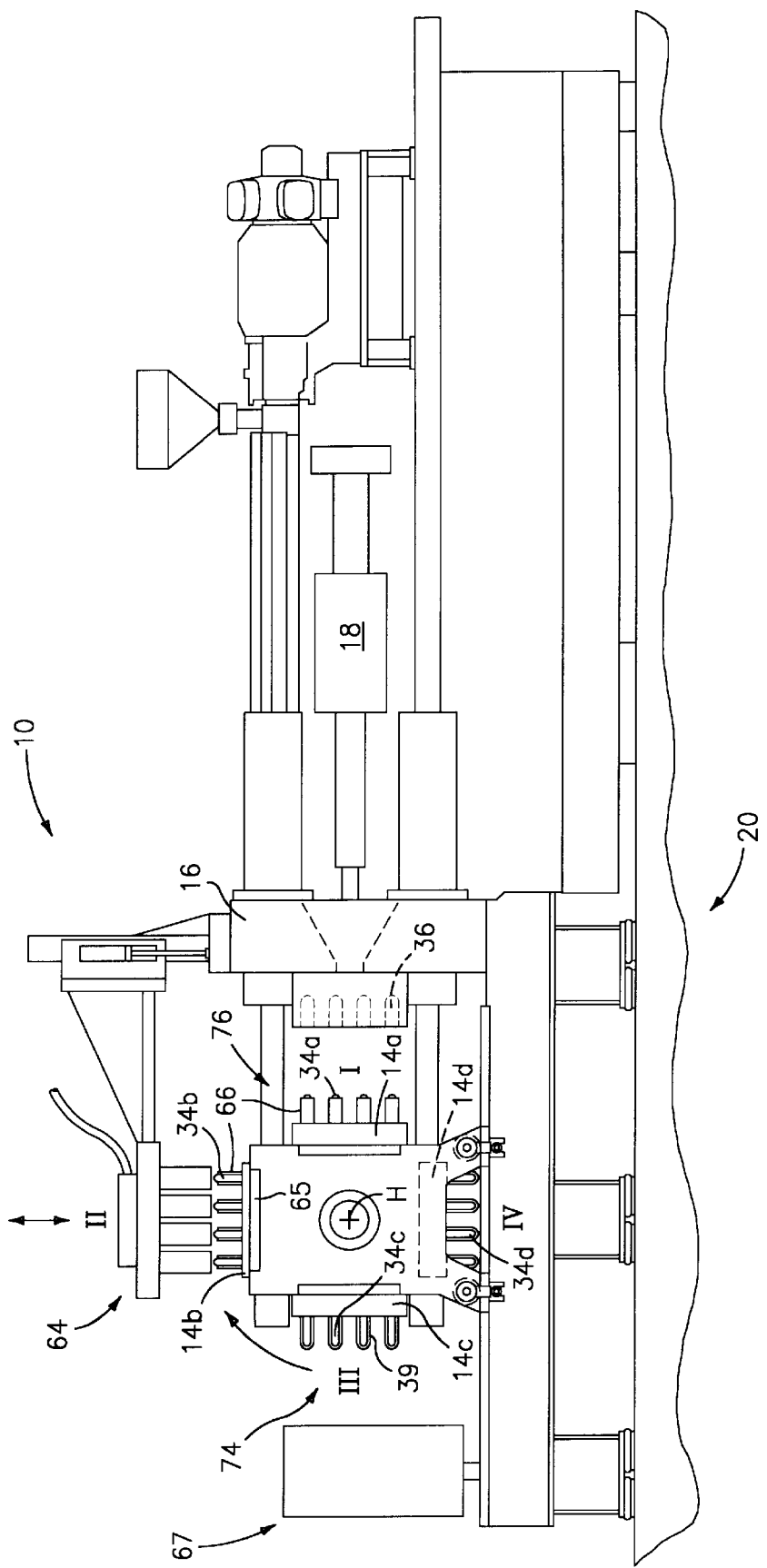
FIG. 10 is a side elevational and schematic view of an injection molding machine of the present invention similar to that shown in FIG. 1, showing an embodiment having an insert loading station and an article removal station.

In FIG. 10, still another embodiment of injection molding machine 10 of the present invention is shown where a robotic article liner loader 64, for example, a preform liner loader, is preferably positioned in at least one of stations I–IV, and preferably at station II, wherein liners 66 are loaded onto the mold cores of sets 34a–34d of each of movable mold halves 14a–14d, respectively, of turret block 12 and block 12 is preferably rotated clockwise. Accordingly, prior to being rotated into alignment, both vertically and horizontally, and longitudinally moved into engagement with stationary mold half and platen 16, one of sets of mold cores 34a–34d are loaded with the liners 66. Preferably, liners 66 are held on the mold cores of sets 34a–34d of movable mold halves 14a–14d, respectively, by vacuum source 65 (shown schematically) applied through the mold cores. Subsequently, turret block 12 is rotated so that mold cores of sets 34a–34d with liners 66 thereon are in alignment with set of mold cavities 36. Turret block 12 is then preferably moved to the closed position such that one of movable mold halves 14a–14d and stationary mold half and platen 16 are engaged. In this manner, resin may be injected by injection unit 18 over liners 66 for producing a two-layered molded article, for example, a two-layered preform.

In another embodiment, and also shown in FIG. 10, one of stations I–IV, preferably station III, may include a finished article removal mechanism 67 (shown schematically), which functions to remove finished molded articles 39 from the mold cores of sets 34a–34d of movable mold halves 14a–14d, respectively. As shown in FIG. 10, removal mechanism 67 is positioned at an article removal area 74 which is substantially unobstructed by molding area 76, defined between the movable mold halves of turret block 12 and mold half 16, unlike machines using turret blocks which are positioned between two mold halves. Accordingly, article removal area 74 is located outside of the article molding area 76 and the other stations, allowing for clear unobstructed access to finished molded articles for removal. This feature is particularly applicable to the removal of large molded articles or hard to handle molded articles, such as furniture and complex automotive parts. As a result, substantial space saving is achieved, wherein extra space does not have to be provided upon separation of the mold halves to accommodate the removal device. Similar to removal system 67, another advantage is that unobstructed access to finished molded parts is also provided for manual part removal.

In a preferred embodiment, article removal mechanism 67 is in the form of a robotic device (shown schematically as 67) automatically movable into and out of engagement with finished molded articles in area 74.

In another preferred embodiment, and which is applicable to the removal of molded closures from movable mold halves 14a–14d, an external unscrewing head (shown schematically as 67) may be used. The unscrewing head is preferably mounted on base 20 at station III in area 74 in which multiple chucks, preferably one per cavity, are used to unscrew molded closures from the mold cores of sets of mold cores 34a–34d. An unscrewing head for use herein is shown in U.S. Pat. No. 3,328,844, issued Jul. 4, 1967, to the assignee of the present invention which is hereby incorporated by reference with particular attention to FIGS. 1–8, and column 3, line 25 to column 8, line 56.

Figure 10A:
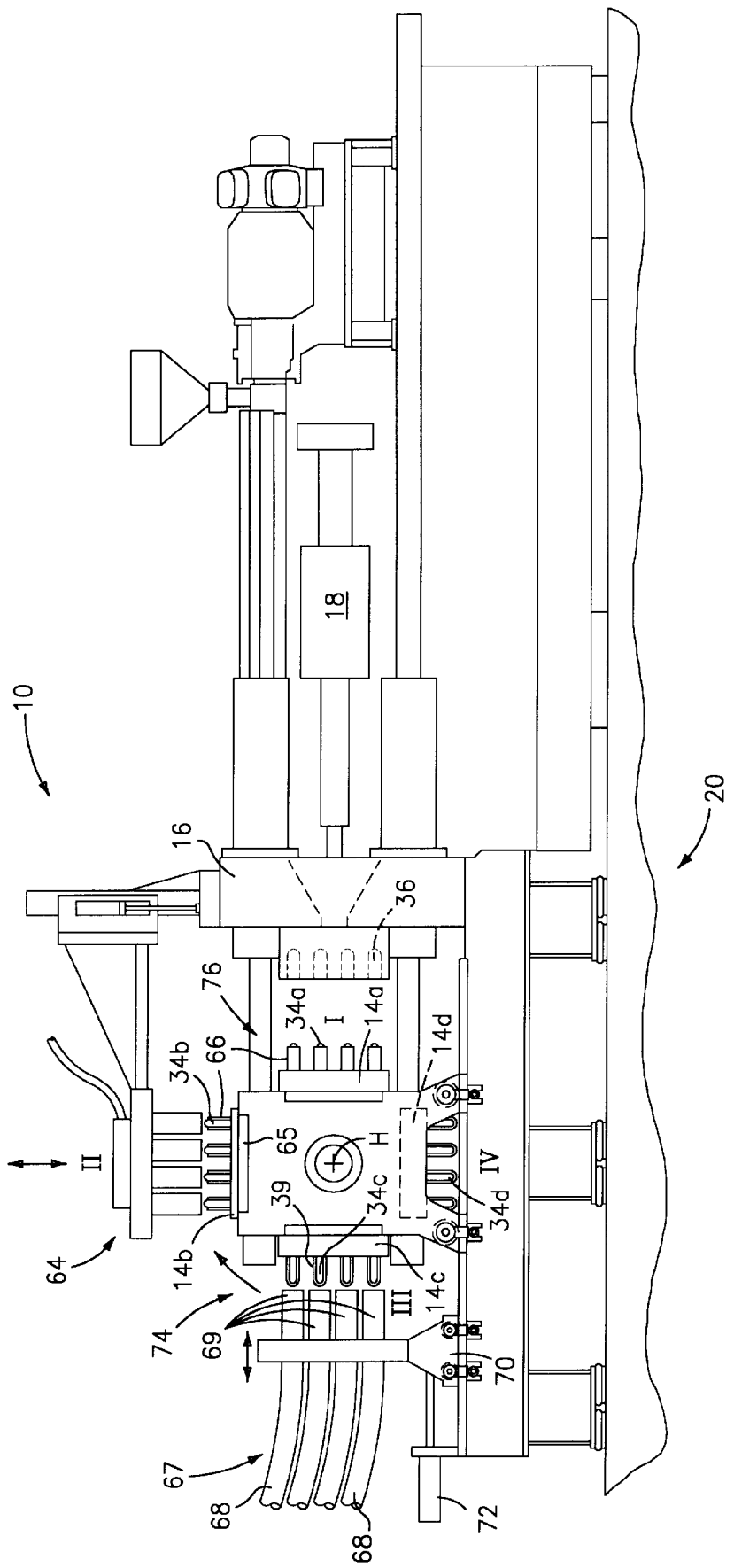
FIG. 10A shows a more detailed embodiment of a schematically shown molded article removal station of FIG. 10.

And another preferred embodiment of the removal mechanism is shown in FIG. 10A, which depicts an enlarged detailed version of schematic removal mechanism shown in FIG. 10. This removal mechanism is preferably in the form of airveyors 69 positioned for alignment with mold cores, at station III. The airveyors include tubes 68 for applying vacuum to the finished molded articles 39. Airveyors 69 may be moved toward and away from turret block 12 via a movable platform 70 movable via a piston/cylinder assembly 72, which is preferably connected with platform 70. Accordingly, as the articles are continually cooled during rotation from station to station, finished articles are then removed via molded article removal mechanism 67.

In operation, one of mold halves 14a–14d and mold half and platen 16 are closed as shown in FIG. 1, aligning one set of mold cores 34a–34d, for example mold half and platen 14a with set 34a, with set of mold cavities 36. Resin is preferably injected through injection unit 18, or if two units are used for co-injection, units 18a and 18b, thereby filling the mold. The finished molded articles 39 are allowed to cool at least to the point where opening the mold will not deform the molded articles. Movable mold half and platen 14a, for example, and stationary mold half and platen 16 are then opened, as shown in FIGS. 2 and 5, whereby turret block 12 is preferably moved on rollers 22 over hardened ways 24 by piston/cylinder assemblies 40a–40d moving tie bars 44a–44d away from stationary mold half and platen 16.

Turret block 12 is then rotated 90° to present a fresh set of mold cores, for example set 34b of mold half and platen 14b into alignment and engagement with set of mold cavities 36. Since the molded articles shrink onto the cores they will continue cooling as turret block 12 rotates so that the mold can be open much sooner than with any conventional molding cycles. For example, while molded articles positioned on the set of mold cores 34a on movable mold half and platen 14a are moved from station I to each of stations II, III and IV, sets of mold cores 34b–34d of mold halves 14b–14d, are presented for engagement with the set of cavities 36 of stationary mold half and platen 16, and molded articles on movable mold half and platen 14a are subject to at least one post molding operation and in many times a plurality of post molding operations including cooling.

In addition, pre-molding operations, such as liner insertion, for preforming multi-layered articles such as preforms, can be accomplished prior to rotation of movable mold half and platen 14a, or any other mold half, back into alignment and engagement with stationary mold half and platen 16. Accordingly, at each of stations II, III and IV, post molding or pre-molding operations such as cooling and labeling and finished molded article removal, as shown in FIGS. 7, 9 and 10, respectively, and liner or insert loading as shown in FIG. 10, and discussed above, can be carried out.

For example, and more specifically, as a movable mold half moves to station II, temperature conditioning system 54 may be used to hasten cooling of molded articles, for example, preforms. Alternatively, at station II, as shown in FIG. 9, labels via label loading robot 56 may be applied to the finished molded articles, for example, preforms, in the manner discussed above. As shown in FIG. 10, finished preforms may be removed at station III from, for example, set of mold cores 34a of movable mold half and platen 14a via ejector pistons in set 38a, driven by the supplied hydraulic services, and article removal device 67, as discussed in detail above. Due to the unobstructed location of removal area 74 with respect to molding area 76, the article removal device, preferably a robot shown schematically as 67, is easily moved into position for removal. If closures or the like with inner threads or the like are being molded, an external unscrewing head may be positioned in removal area 74 for facilitating removal of the closures, as discussed in the incorporated reference.

FIG. 10 also shows an opposite direction of rotation of turret block 12. In this embodiment, and maintaining the same frame of reference as discussed above, finished molded articles are moved from station I to stations IV–II, in that order for forming multilayered molded articles, for example, preforms, via an overmolded liner. For illustration purposes, movable mold half and platen 14d is moved through each of stations I–IV.

Accordingly, finished molded articles, such as preforms, are molded on the mold cores of set 34d of movable half 14d and first moved to station IV whereat they are preliminarily cooled while a new set of molded articles, for example, preforms, are molded on movable mold half and platen 14a. Upon a completed rotation, while finished molded articles are being held via vacuum 65 on set of cores 34a on movable mold half and platen 14a at station IV, movable mold half and platen 14d is preferably moved to station III where set of ejector pistons 38d, part of a system actuated via hydraulic services S, and article removal device 67 are used to remove the finished molded articles 39, such as preforms, from the mold cores of set of mold cores 34a.

Mold half and platen 14d is rotated to station III and finished molded articles 39, such as preforms, from set of mold cores 34a on movable mold half and platen 14a are removed via device 67. At station II, liners 66 are loaded onto set of mold cores 34d of movable mold half and platen 14d for overmolding to form a multi-layer molded article, such as a multilayered preform, at station I. At the same time, movable mold half and platen 14c is moved into alignment with stationary mold half and platen 16, turret block 12 is moved longitudinally toward stationary mold half and platen 16, and a molding operation is preferably performed wherein an outer layer is overmolded over insert liners 66 to form another set of multi-layered articles, such as preforms. Finally, movable mold half and platen 14d with liners 66 on set of mold cores 34d is rotated for engagement with mold half and platen 16 and set of mold cavities 36.

If, in any of the operations discussed above, a molded article formed from more than one material is desired, the plurality of injection units 18a and 18b may be used along with the two material hot runner system 52, as discussed above, for molding articles formed from more than one material.

Any combination of the post-molding and premolding operations can be performed at the plurality of stations I–IV wherein the embodiments given above are by way of example only. While it is shown and preferred that the mold cores be located with the turret block, it may also be possible to switch the positioning of the mold cores and cavities among the turret block and stationary platen if a movable injection unit is used. Resin, therefore, would be supplied to the mold cavities through services S.

In addition, if desired, a multi cavity blow mold may be used at one of the stations.

Figure 11:
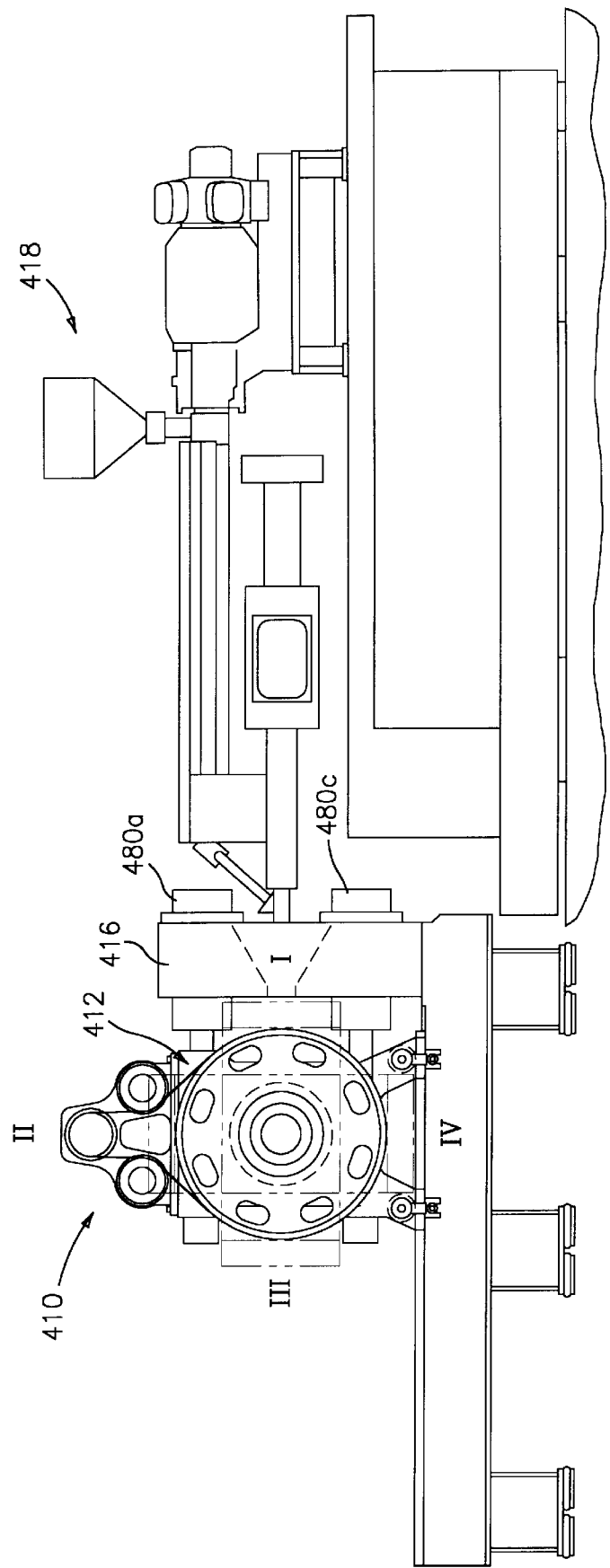
FIG. 11 is a side elevational and partially schematic view showing another embodiment similar to FIG. 1.
Figure 12:
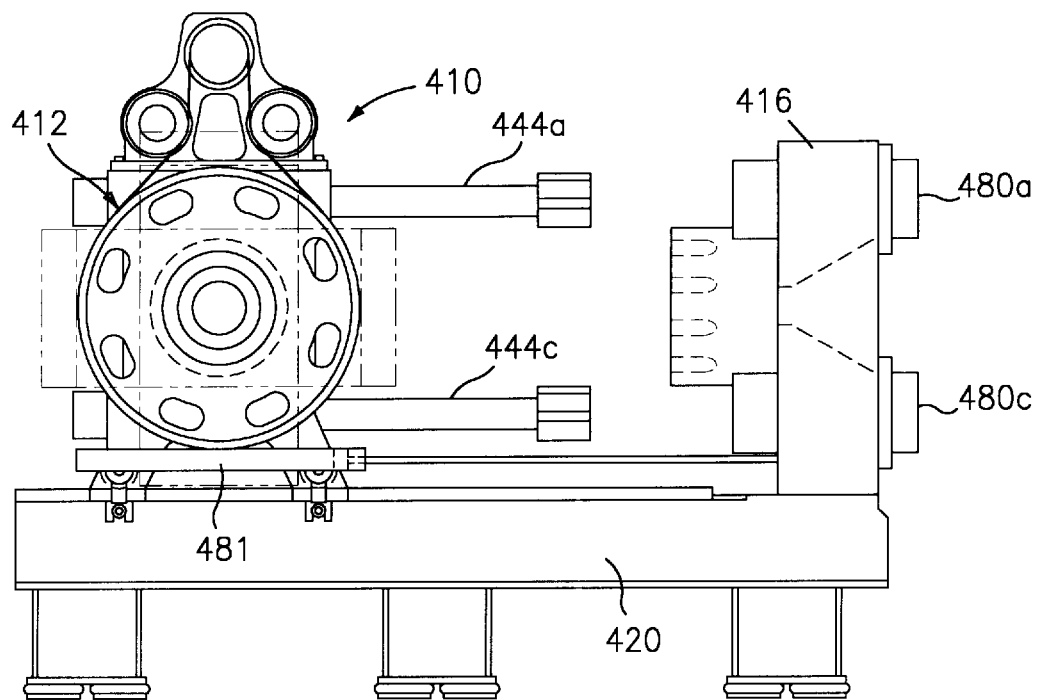
FIG. 12 is a partial elevational side view of the clamp portion of the machine of FIG. 11 in an open position.
Figure 13:
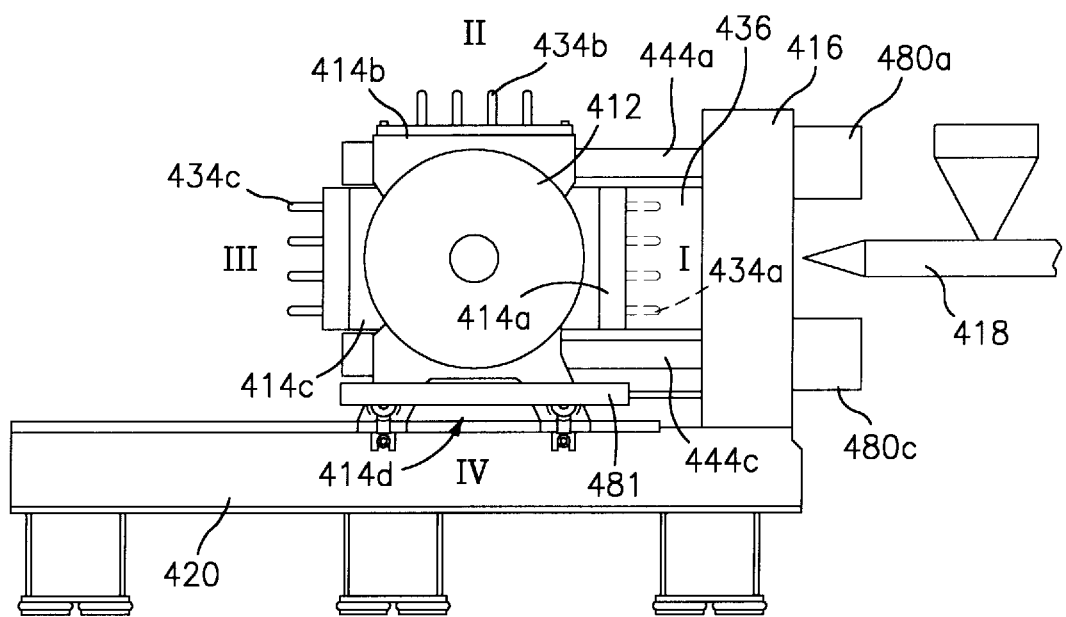
FIGS. 13–14 are side elevational and partially schematic views of other embodiments of an injection molding machine in accordance with the principles of the present invention, similar to that shown in FIG. 1.

FIGS. 11–13 are side elevational views similar to FIGS. 1–2, with FIG. 11 in the closed position, FIG. 12 in the open position and FIG. 13 showing a simplified, schematic view in the closed position with portions removed for clarity.

In the embodiment of FIGS. 11–13, turret block 412 of injection molding machine 410 includes injection unit 418, which can be a reciprocating screw or two stage injection (preplasticizing) unit, stationary platen 416, tie bars 444a, b, c, d (only 444a & c shown), clamp units 480a, b, c, d (only 480a & c shown), and clamp stroke cylinder 481. There can be up to four clamp stroke cylinders, but for clarity only one is shown. Clamp base 420 is also shown similar to the other embodiments. Mold cavity 436, shown in FIG. 13 in the mold closed position and in FIG. 12 in the mold open position, the four mold cores 434a, b, c, d (434b not shown), and movable mold halves 414a, b, c, d are also shown. The operation is similar to that shown in FIGS. 1–2, except that up to four separate clamp or stroke cylinders 481 are used to move turret block 412, and clamping is performed by four clamp units 480a, b, c, d mounted on stationary platen 416. The clamp units engage splines on the ends of the four tie bars 444a, b, c, d. In the mold open position shown in FIG. 12 the tie bars completely disengage from the clamp units as clearly shown.

Figure 14:
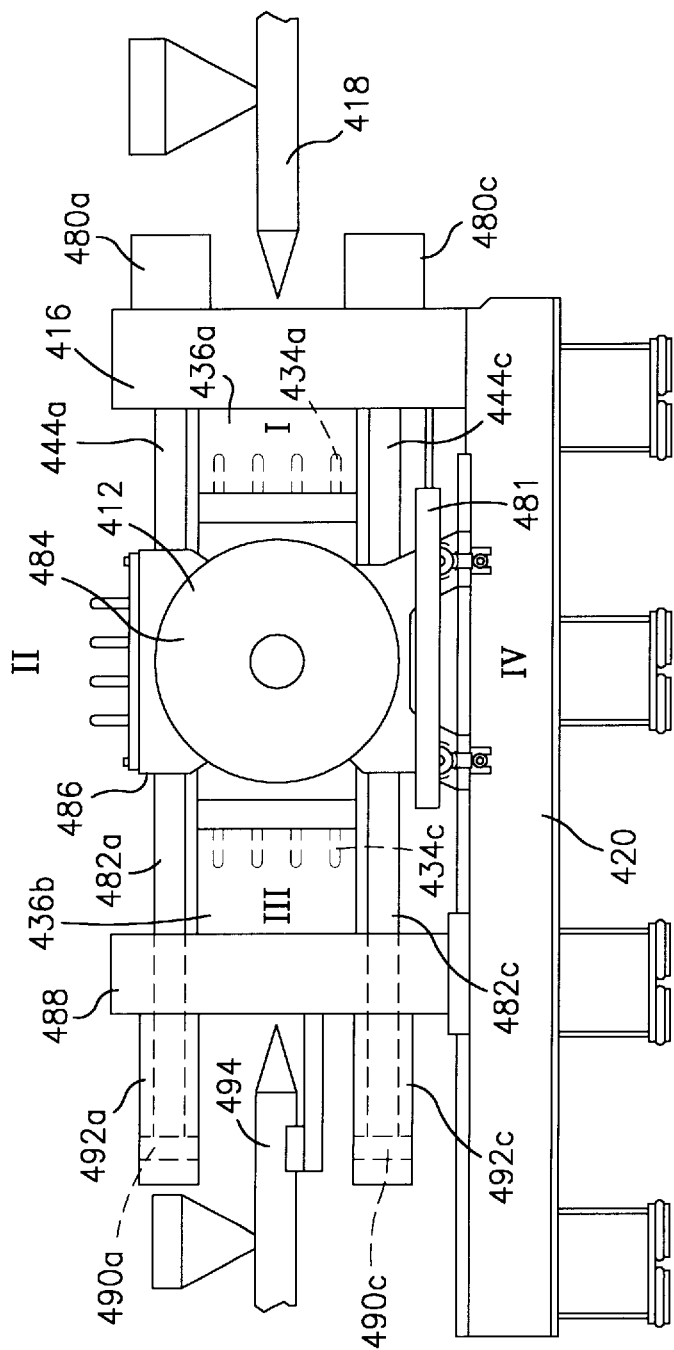

FIG. 14 shows an injection molding machine in accordance with a further embodiment and in the mold closed position. FIG. 14 includes turret block 412 and first injection unit 418. The turret block 412 slides on clamp base 420 by means of stroke cylinders 481 mounted on the turret block and attached to stationary platen 416 as shown in FIGS. 11–13. Tie bars 444a, b, c, d (only 444a & c shown) attached to first face 484 of turret block 412 extend from the turret block towards the stationary platen 416. Clamp units 480a, b, c, d (only 480a & c shown) engage the tie bar ends to clamp first mold cavities 436a to mold core set 434a as in FIG. 13.

FIG. 14 also shows cylinder rods 482a, b, c, d (only 482a & c shown) attached to second face 486 of turret block 412 extending from the turret block away from stationary platen 416 and passing through bearings in mounting platen 488 terminating at pistons 490a, b, c, d (only 490a & c shown) inside cylinders 492a, b, c, d (only 490a & c shown) mounted to the back face of mounting platen 488. Mounting platen 488 is free to slide on clamp or machine base 420. A second injection unit 494 mounted via frame 496 to the back face of mounting platen 488, connects via a hole in the mounting platen (not shown) to second mold cavities 436b attached to mounting platen 488. Therefore, in the closed position at station III the third core set 434c is clamped via cylinders 492a, b, c, d to second mold cavity 436b to form a second shot injection cavity while a first shot injection cavity is formed at station I.

Figure 15:
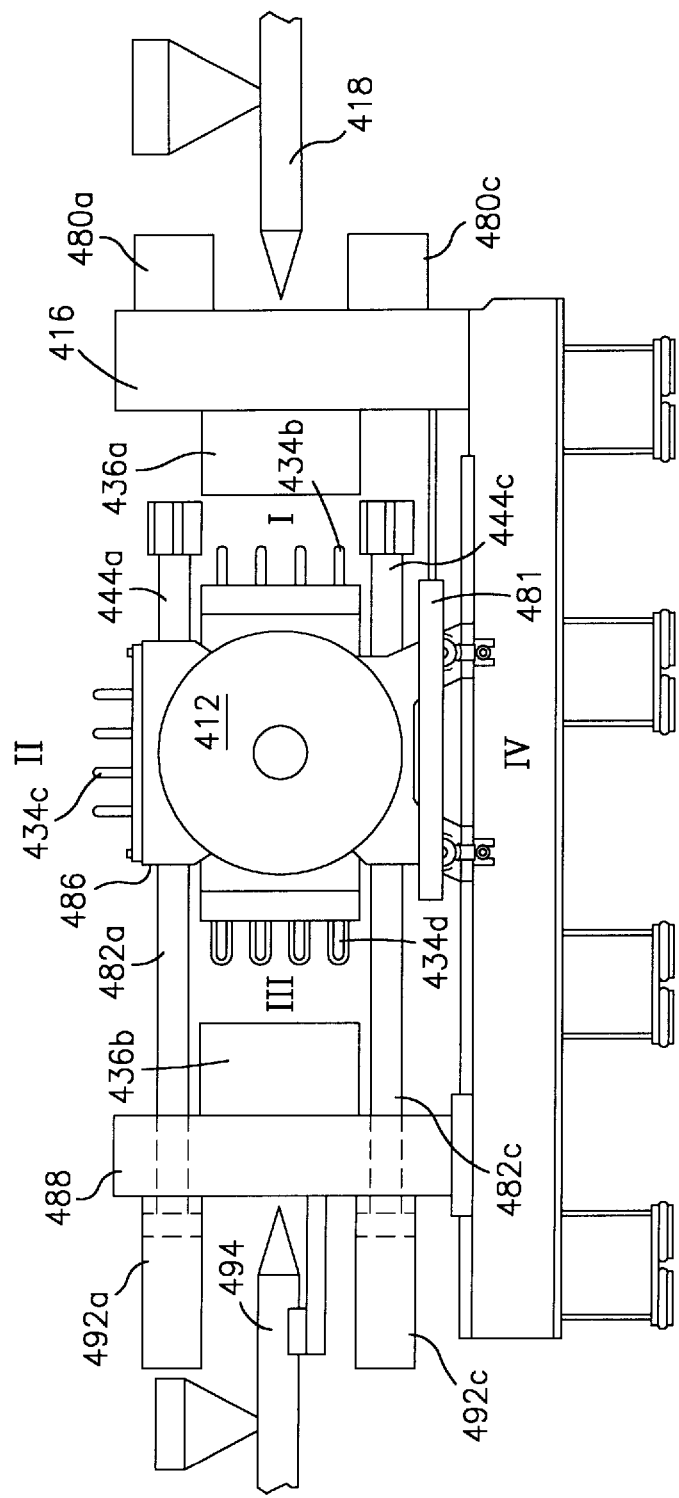
FIG. 15 is a side elevational and partly schematic view of the machine of FIG. 14 in the open position.

FIG. 15 shows the machine of FIG. 14 in the open position with turret block 412 rotated 90° clockwise from the position shown in FIG. 14. The clamp units have released tie bars 444a, b, c, d (only 444a & c shown) and stroke cylinders 481 have moved turret block 412 away from the stationary platen 416. Simultaneously, or a short time later or before, cylinders 492a, b, c, d (only 492a & c shown) unclamp the second shot mold set at station III and extend to open second mold cavities 436b. In this mold open position, turret 412 is free to rotate, clockwise in this embodiment, one position to align second core set 434b with first mold cavities 436a and also to align fourth core set 434d with second,mold cavities 434b, as shown in FIG. 15. Stroke cylinders 481 and cylinders. 492a, b, c, d can be activated simultaneously if desired to close both molding stations at stations I and III and to permit injection of resin from injection units 418 and 494 simultaneously or slightly phased part.

Intermediate stations II and IV can be used for other functions, as for temperature conditioning, insert loading and/or ejection of the finished parts.

The clamping of the molds at the two stations I and III differs in clamping force. The units for clamping at station I generate higher forces and are mounted on a fixed platen rigidly mounted to the machine base. In comparisons clamping at station III is done at a comparatively lower force level in a less rigid structure since all components being clamped can slide on the machine base. In cases where a comparatively thin layer of a multilayered article is to be molded, injection and holding of the resin is performed at station I where higher clamp forces and a rigid structure for good alignment is available. Comparatively thick layers of a multilayered article, where less clamp force and rigidity are required, can be molded at station III.

Figure 16:
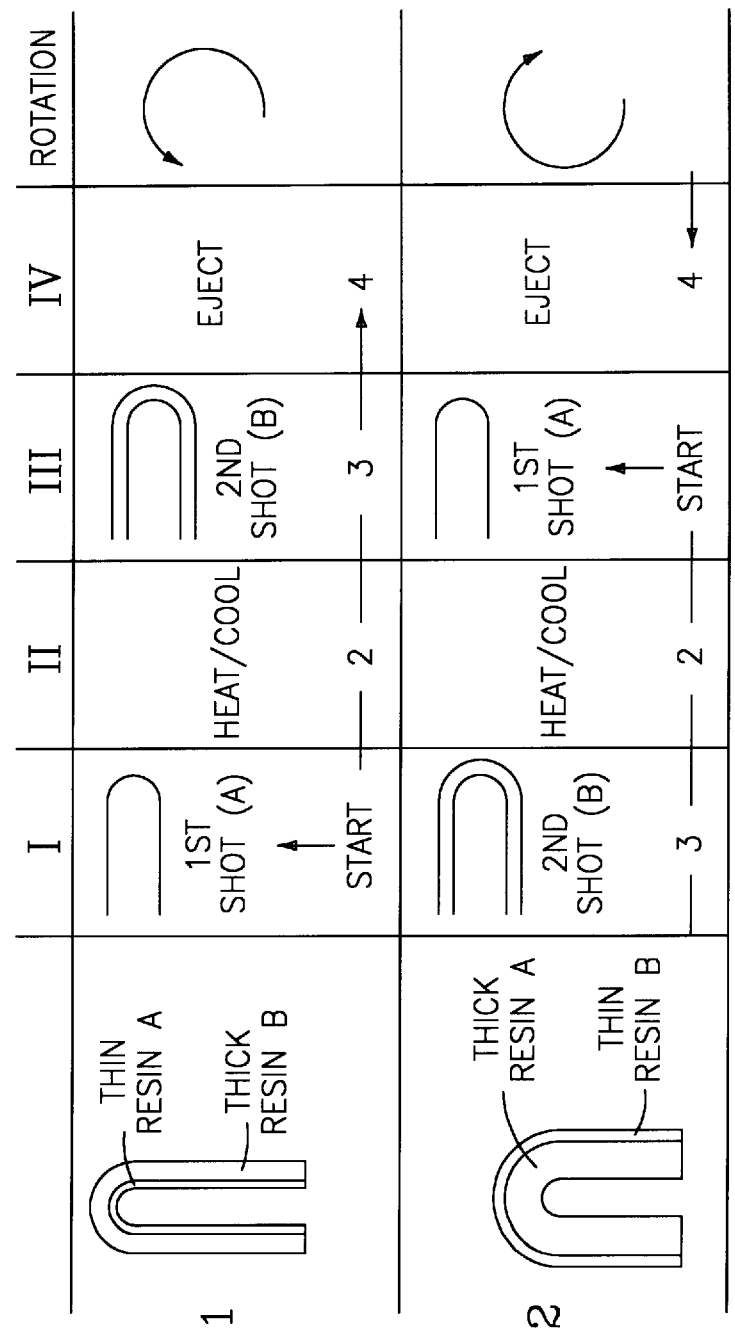
FIG. 16 is a chart that summarizes some of the operations that can be performed at various mold stations.

FIG. 16 is a chart that summarizes some of the operations that typically can be performed at various mold stations I, II, III and IV. The first example shows the molding of a two layered article having a relatively thin first shot inner layer formed from resin "A" and a relatively thick second shot outer layer formed from resin "B". Referring to FIGS. 14–15, in the mold closed position resin "A" is injected from unit 418 to form a first shot layer on the mold cores. The molds at stations I and III are opened and turret 412 rotated one station, in this case 90° in the counterclockwise direction. The thus freshly molded first shot moldings can be temperature conditioned at station II as shown for example in FIG. 9. After a second set of first shot moldings have been molded at station I the molds are opened and turret 412 rotated one more station, another 90°. The first set of first shot moldings are now aligned with the second shot cavities at station III. The molds are closed and injection from both units 418 and 494 simultaneously, or slightly phased apart, produce a finished article at station III as shown in the first example in FIG. 16 and a fresh set of first shot moldings at station I. Second shot injection unit 494 injects second resin "B" to overmold the first shot parts in second mold cavity 436b, thus forming a two layered article having a comparatively thin inner layer molded from resin "A" and a comparatively thick outer layer molded from resin "B". The molds open once again, turret 412 again rotates one station, another 90°, and the finished parts can be ejected at station IV underneath turret 412, possibly into a downstream handling system. The molds open once again and the cycle is repeated.

The second example in FIG. 16 shows an additional possible molding sequence. In this case, a two layered article is to be molded having a comparatively thick inner layer from resin "A" and a comparatively thin outer layer from resin "B". In this sequence, turret 412 rotates in a clockwise direction and the first shot is performed at station III because only a relatively low clamp force is required. When the turret is rotated from station III to station II the first shot parts from station III are temperature conditioned at station II, and on further rotation to station I the second shot resin is injected over the first shot resin at station I where high clamp force is required to form a relatively thin outer layer as shown in FIG. 16. Ejection takes place at station IV.

Thus, by employing the appropriate molds at stations I and III and by rotating the turret in either clockwise or counterclockwise directions, various molding sequences can be used to form a variety of multilayered articles using overmolding. This procedure and apparatus is not limited to two separate and/or different materials. A third injection unit and low clamping mold set can readily be installed at station II, for example, to allow articles to be molded from up to three different resins.

Figure 17:
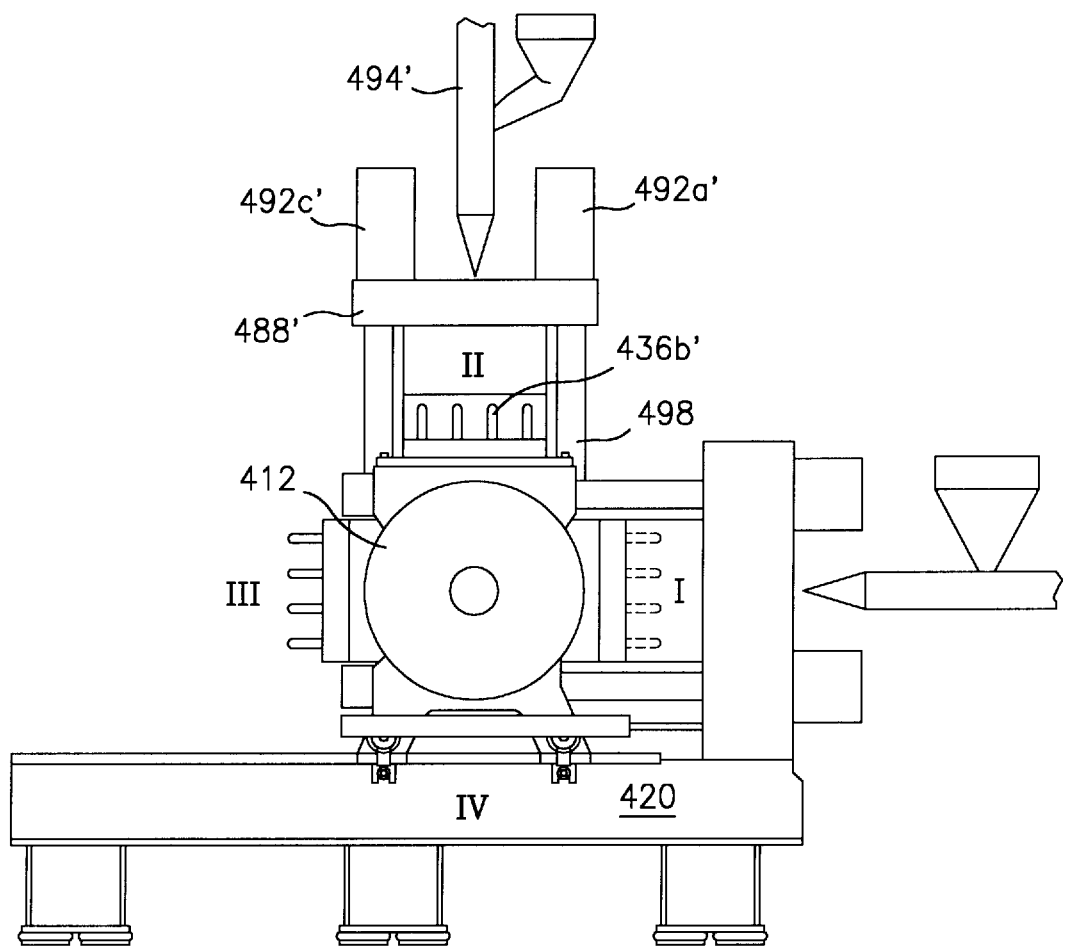
FIG. 17 is a side elevational and partly schematic view of another embodiment similar to FIG. 13 with a second clamp and injection unit mounted on the turret.

Alternatively, the second injection unit and mounting platen and second shot cavity can all be mounted at station II as shown in the embodiment of FIG. 17. As shown in FIG. 17, station II includes mounting platen 488' which is moved towards and away from turret block 412 by cylinders 492a', b', c', d' (only 492a' and c' shown). Mounting plate 488' carries second shot mold cavities 436b' on one face which faces towards turret block 412 and second injection unit 494' on its opposite face. The entire assembly is mounted on and travels with turret block structure 498 as it slides horizontally on base 420. In operation, the first relatively thin layer is molded at high clamp force at station I. After a first counterclockwise rotation of 90° to the next adjacent station, station II, the first shot moldings from station I are aligned with the second shot mold cavities 436b' at station II. The low force clamp unit at station II closes and the second injection unit 494' feeds the second material to form a relatively thick overmolded second layer. Stations III and IV can be used for subsequent cooling, ejection or other operations during the same cycle of the machine. As before, if the relatively thick layer is desired to be molded first, then this is done at station II and the turret block 412 rotates clockwise to perform the second shot, followed by relatively thin layer overmolding at station I, followed by cooling at station IV and ejection of the finished parts at station III.

Figure 18:
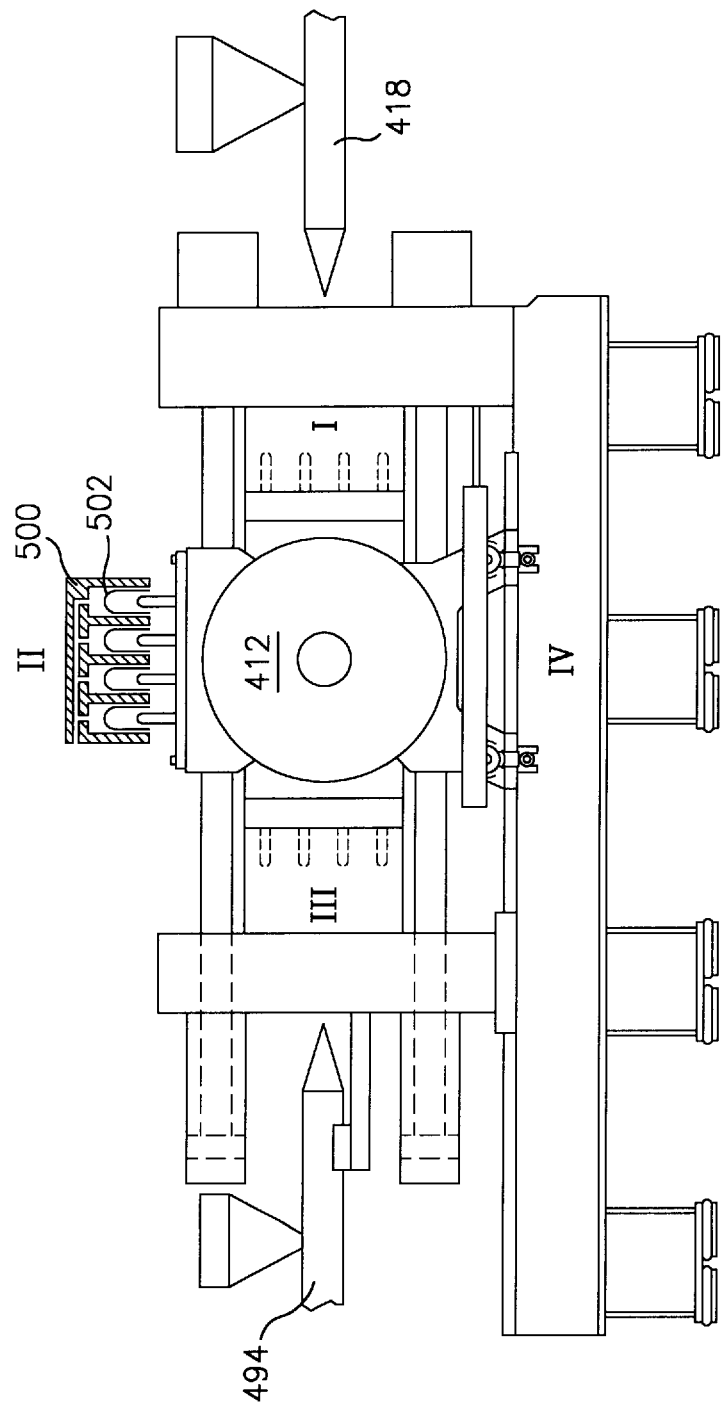
FIG. 18 is a side elevational view similar to FIG. 14 showing an alternate embodiment.

FIG. 18 shows another embodiment of the present invention wherein an insert is added to the structure of the article. In this embodiment, an insert loading robot 500 is shown schematically at station II, but could also for example be shown at station IV, or for the embodiment of FIG. 17 at stations III or IV. At some point in the cycle the robot loans an insert 502 onto a freshly molded article or onto an empty core. The insert can then be completely or partially enclosed with one or two subsequent molding steps, or can simply be bonded to the outside of the article. obviously, various thickness layers can be included by the machine or process as described above and a variety of combinations of injections and turret rotational directions can be employed to make a composite article including an inserted piece and injected resin layers.

Figure 19:
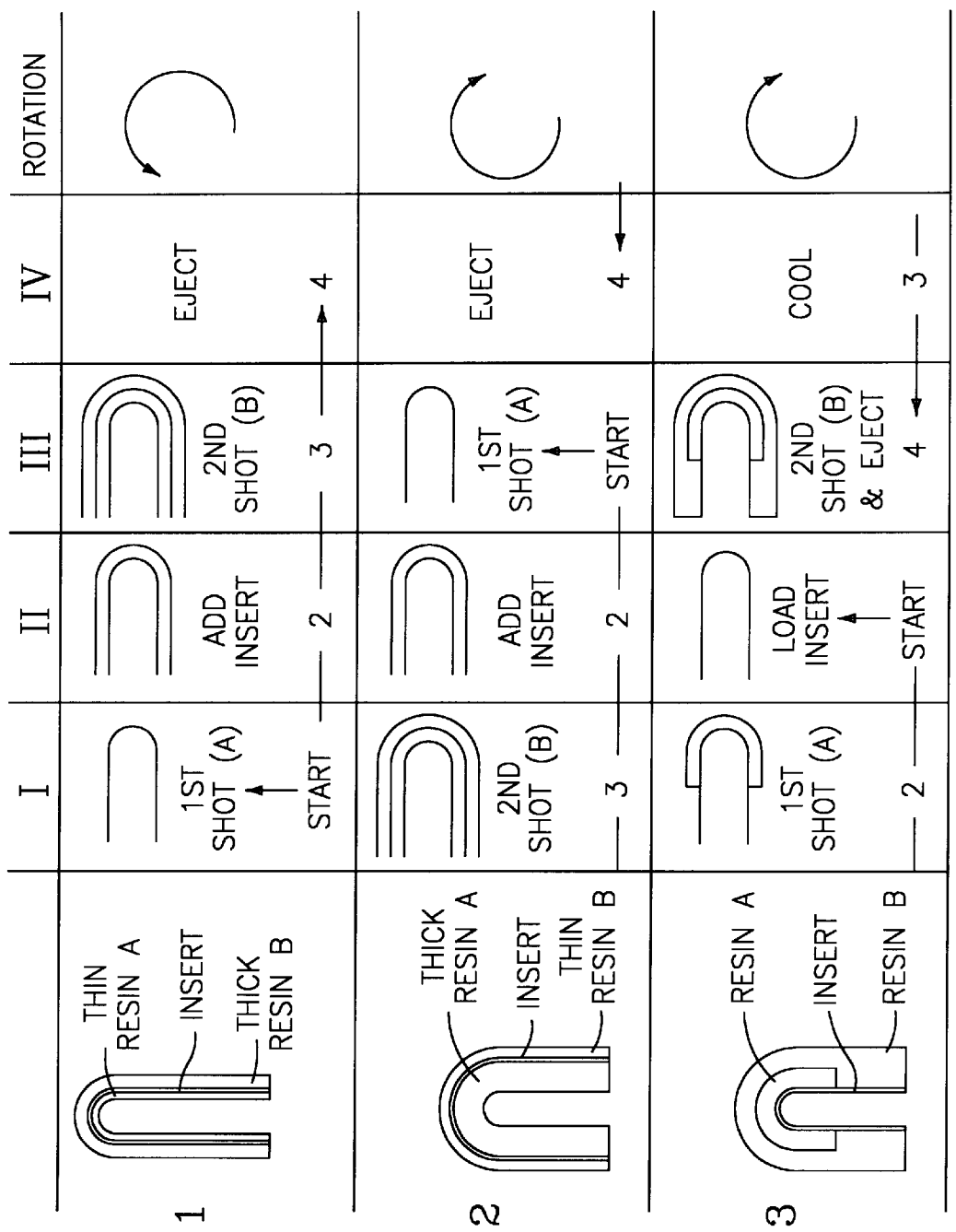
FIG. 19 is a chart that summarizes some of the operations that can be performed at various mold stations.

FIG. 19 shows a variety of cycles of the machine of FIG. 18. Example 1 shows an article having a relatively thin inner layer molded from resin "A", an insert added to the outer surface of the inner layer, and a relatively thick outer layer injection molded from resin "B". The cycle starts at station I of FIG. 18 where resin "A" is injected at the high clamp force station. The insert 502 is loaded over the injected resin "A" by robot 500 at station II as shown schematically in FIG. 18, at station III resin "B" is injected over the insert at the low clamp force station, and the finished article is ejected at station IV, the turret rotation being counterclockwise.

Example 2 shows an article having a relatively thick inner injection molded layer from resin "A", an insert added to the outer surface of the inner layer, and a relatively thin outer injection molded layer from resin "B". The cycle starts at station III where resin "A" is injected at the low clamp force station. At station II, insert 502 is loaded onto resin "A" by robot 500, at station I resin "B" is injected onto the insert at the high clamp force station, and the finished article is ejected at station IV, the rotation being clockwise.

Example III shows an article having an inner surface formed from an insert, and two outer layers, one partially covering the insert and the other covering both the first shot resin and the insert. The cycle starts at station II where the insert is loaded onto the empty mold core. At station I resin "A" is injected to partially cover the insert, temperature conditioning is done at station IV, at station III resin "B" is injected to cover the insert and the first shot resin "A", and ejection is also done at station III when the "mold open" position is reached and immediately before turret 412 is rotated, clockwise in this application.

These examples further illustrate the flexibility of the machine of the present invention and the machine is not intended to be limited to these examples alone. Naturally, many other processing sequences can be performed in which resins can be utilized with or without inserts to form multilayer articles in a convenient and expeditious manner.

A primary advantage of this invention is that an energy and space efficient injection molding machine having a reduced cycle time is provided which includes a longitudinally movable and rotatable turret block. Another advantage of this invention is that a two platen injection molding machine is provided including a longitudinally movable and rotatable turret block, wherein combinations of pre-mold and post mold operations may be efficiently achieved on one machine using different stations of the turret block, thereby reducing cycle time. Still another advantage of this invention is that a two platen injection molding machine is provided having a longitudinally movable and rotatable turret block, wherein operations such as insert loading, injection, multilayer injection, label loading, temperature conditioning, and direct unloading of molded articles can be achieved at different angular positions in a continuous and efficient manner using one machine having a plurality of stations, thereby reducing cycle time, floor space consumption, and energy consumption. Yet another advantage of this invention is that an energy, cycle time and space efficient two platen injection molding machine is provided having a rotatable turret block which includes a plurality of movable mold clamps for forming molds for the injection molding of articles. And yet another advantage of this invention is that a two platen injection molding machine is provided using a movable and rotatable turret block which turret block includes a plurality of mold halves movable toward and away from a mating stationary mold half for forming molds for injection molding articles in an energy and cycle time efficient manner. And another advantage of this invention is that a two platen injection molding machine is provided including a rotatable turret having a plurality of mold half sides and a plurality of stations to which the mold half sides are rotated for pre-molding and post molding operations.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for injection molding, comprises:

providing an injection molding machine having a first mold half with one of at least one mold cavity and at least one mold core, and a rotatable turret means which is rotatable on an axis for rotating a plurality of mold halves thereof into alignment with said first mold half, each of said movable mold halves including one of a mold cavity and mold core matable with said first mold half for forming a mold for molding a molded article, said rotatable turret further clamping said movable mold halves and said first mold half together;

moving said rotatable turret means relative said first mold half;

injecting melt from a first injection means into said mold at a first injection station to form an injection molded article; and injecting melt from a second injection means adjacent said injection molded article to form an injection molded article containing at least two melt feedings.

2. A process according to claim 1 including injecting melt from said second injection means at a second injection station spaced from said first injection station.

3. A process according to claim 1 including forming an injection molded article having at least two layers.

4. A process according to claim 3 including rotating said turret into alignment with said first mold half, and rotating said turret into alignment with a second mold half at a second injection station.

5. A process according to claim 4 including injecting a relatively thin layer of plastic at one of said injection stations, and injecting a relatively thick layer of plastic at another of said injection stations.

6. A process according to claim 4 including relatively moving said first mold half and movable mold halves from a mold open to mold closed position at said first injection station, and relatively moving said second mold half and movable mold halves from a mold open to mold closed position at said second injection station.

7. A process according to claim 6 including opening and closing said first and second injection stations in sequence.

8. A process according to claim 7 including loading an insert at one of said turrent stations and forming a composite article by said injection molding machine.

9. A process according to claim 8 including forming a three layer article.

10. A process according to claim 6 including opening and closing said first and second injection stations simultaneously.

11. A process according to claim 6 including rotating said turret to a plurality of separate turret stations, one of which being said first injection station and another of which being said second injection station.

12. A process according to claim 11 including rotating said turret to four of said separate turret stations.

13. A process according to claim 12 including locating said first injection station at a first of said separate turret stations and locating said second injection station at a third of said separate turret stations.

14. A process according to claim 11 including separating said first and second injection stations by one of said separate turret stations.

15. A process according to claim 11 including locating said first and second injection stations on adjacent turret stations.

16. A process according to claim 6 including generating a higher mold clamp force in said mold closed position at the first injection station than in the mold closed position at the second injection station.

17. A process according to claim 1 including injecting melt into said mold substantially vertically.

18. A process according to claim 1 including injecting melt into said mold substantially horizontally.

19. An injection molding machine comprising:

a first mold half having one of at least one mold cavity and at least one mold core;

a rotatable turret means rotatable on an axis for rotating a plurality of movable mold halves thereof into alignment with said first mold half, each of said movable mold halves including one of a mold cavity and mold core matable with said first mold half for forming a mold for molding a molded article, said rotatable turret means further clamping said movable mold halves and said first mold half together;

means for moving said rotatable turret means relative said first mold half;

a first injection means for injecting melt into said mold at a first injection station to form an injection molded article; and further including at least one second injection means for injecting melt adjacent said injection molded article to form an injection molded article comprising at least two melt feedings.

20. The injection molding machine according to claim 19, including said second injection means at a second injection station spaced from said first injection station.

21. The injection molding machine according to claim 19, wherein said injection molded article has at least two layers.

22. The injection molding machine according to claim 21, including said second injection means at a second injection station spaced from said first injection station.

23. The injection molding machine according to claim 22, including a second mold half having at least one of at least one mold cavity and at least one mold core spaced from said first mold half, wherein said rotatable turret means is rotatable on an axis for rotating said plurality of movable mold halves thereof into alignment with said first mold half at said first injection station, and is rotatable on an axis for rotating said plurality of movable mold halves thereof into alignment with said second mold half at said second injection station.

24. The injection molding machine according to claim 23, including first means for relatively moving said first mold half and movable mold halves from a mold open to mold closed position at said first injection station, and second means for relatively moving said second mold half and movable mold halves from a mold open to a mold closed position at said second injection station.

25. The injection molding machine according to claim 24, wherein said first and second means are operative to open and close said first and second injection stations in sequence.

26. The injection molding machine according to claim 25, including an insert loading station located at one of said turret stations, wherein said machine is operative to form a composite article.

27. The injection molding machine according to claim 26, wherein said machine is operative to form a three-layered article.

28. The injection molding machine according to claim 24, wherein said first and second means are operative to open and close said first and second injection stations simultaneously.

29. The injection molding machine according to claim 24, wherein said first means is operative to generate a higher mold clamp force in said mold closed position at the first injection station than said second means in said mold closed position at the second injection station.

30. The injection molding machine according to claim 23, wherein said rotatable turret means is rotatable to a plurality of separate turret stations, one of which being said first injection station and another of which being said second injection station.

31. The injection molding machine according to claim 30, including four of said separate turret stations.

32. The injection molding machine according to claim 31, wherein said first injection station is located at a first of said separate turret stations and said second injection station is located at a third of said separate turret stations.

33. The injection molding machine according to claim 30, wherein said first and second injection stations are separated by one of said separate turret stations.

34. The injection molding machine according to claim 30, wherein said first and second injection stations are located on adjacent turret stations.

35. The injection molding machine according to claim 23, wherein one of said injection means injects a relatively thin layer of plastic at one of said injection stations, and another of said injection means injects a relatively thick layer of plastic at the other of said injection stations.

36. The injection molding machine according to claim 19, wherein said first and second injection means are operative to inject melt substantially horizontally.

37. The injection molding machine according to claim 19, wherein at least one of said injection means is operative to inject melt substantially vertically.

38. The injection molding machine according to claim 19, wherein at least one of said injection means is operative to inject melt substantially horizontally.

* * * * *